Patented Nov. 17, 1936

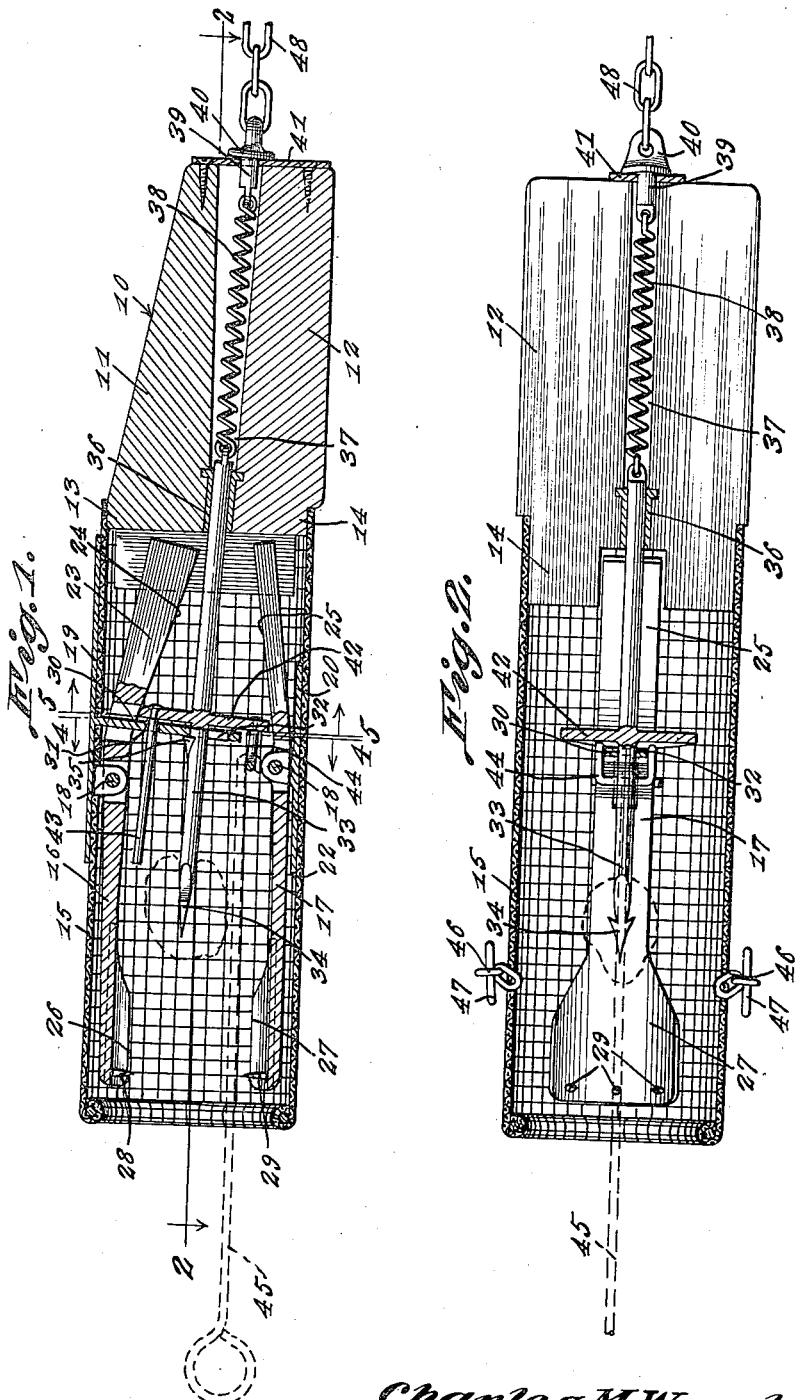

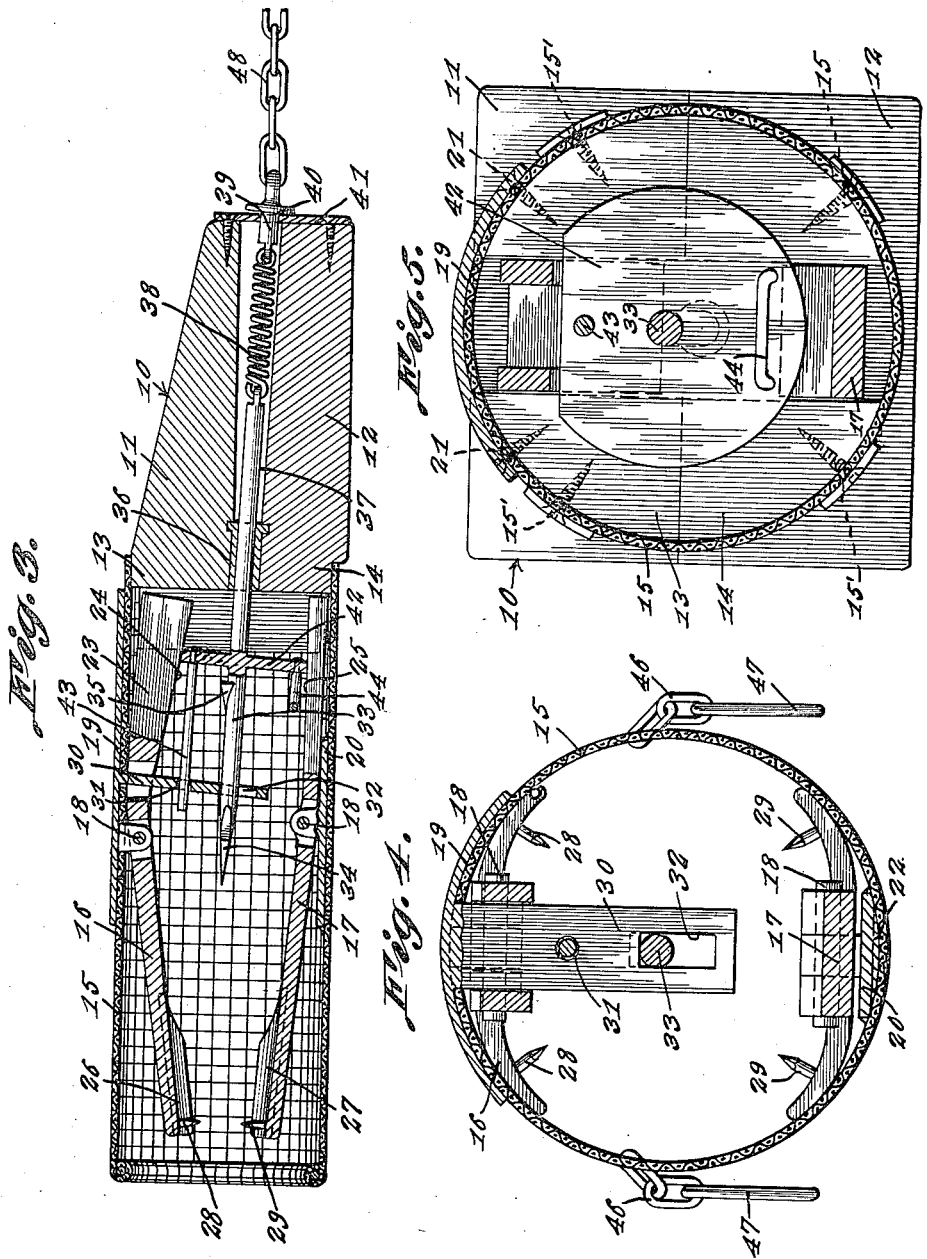

2,061,123

UNITED STATES PATENT OFFICE 2,061,123

GAME TRAP

Charles Martin Ward, Franklin, Mo., assignor of one-fifth to James B. Ward, St. Louis, Mo.

Application November 27, 1935, Serial No. 51,927

4 Claims. (Cl. 43—79)

This invention relates to animal traps and has for an object to provide a trap which may be placed upon the ground, upon trees or fences, or even under the water, and which may be easily baited and set without danger to the trapper.

A further object is to provide an animal trap having novel jaws adapted to be positively closed by a spring controlled cam when the baited trigger is pulled to close upon the animal, there being a novel cylindrical cage enclosing the jaws to force the animal to insert its head in the path of the jaws rather than a leg so that the animal will be humanely killed rather than cripped by the jaws.

A further object is to provide an animal trap which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a longitudinal sectional view of an animal trap constructed in accordance with the invention, with the jaws shown in open position.

Figure 2 is a longitudinal sectional view of the trap taken on the line 2—2 of Figure 1 looking in the direction of the arrows.

Figure 3 is a longitudinal sectional view of the trap similar to Figure 1 but showing the jaws in closed position.

Figure 4 is an enlarged cross sectional view taken on the line 4—4 of Figure 1 looking in the direction of the arrows.

Figure 5 is an enlarged cross sectional view taken on the line 5—5 of Figure 1 looking in the direction of the arrows.

Referring now to the drawings in which like characters of reference designate similar parts in the various views, the trap is shown to comprise a body 10 which is preferably formed of wood and comprises an upper section 11 and a lower section 12 of substantially rectangular cross section, both sections being provided at the forward ends with semi-cylindrical extensions 13 and 14. A cylindrical guard 15 formed of stiff wire mesh is secured at the rear end to the extensions by screws 15'. The guard is open at the front end and is of sufficient diameter to permit an animal to thrust his head and front of the body through the guard.

A pair of jaws 16 and 17 are pivoted intermediate their ends on pivot pins 18 projecting into the guard by bars 19 and 20 which extend respectively along the top of the guard and along the bottom of the guard. The upper bar 19 is secured at the rear end to the extension 13 by screws 21. The lower bar 20 is secured to the guard by soldering, as shown at 22, or may be otherwise secured stationary.

The rear end of the upper jaw is provided with a counter-weight 23 which serves to hold the jaw open and the counter-weight is provided with a cam surface 24 on the lower edge which slopes obliquely from the wall of the guard toward the axis of the guard. The jaw 17 is of greater weight forwardly of its pivot than rearwardly of its pivot so that this jaw normally is disposed in open position. The rear end of the jaw is inclined obliquely from the wall of the guard toward the axis of the guard and is provided on its upper face with a cam surface 25. Both jaws may be formed of metal or other suitable material but whatever material is used it is desirable that the working ends of the jaws be equipped respectively with metal plates 26 and 27 having prongs 28 and 29 that are inclined radially from the plates and impale the animal when the jaws are closed.

By referring now to Figure 4 it will be seen that a bracket arm 30 extends downwardly from the upper bar 19 and is provided with an opening 31 and is also provided with an elongated slot 32 below the opening. A trigger 33 is slidably fitted in the slot 32 and is provided at the front end with a spear head 34 to receive the bait. The trigger is provided with a projection 35 which engages against the front face of the bracket arm 30 above the top edge of the slot 32 when the trigger is pulled forward to set the trap. The trigger 33 is slidably fitted in a bushing 36 disposed in an opening 37 formed axially in the body 10.

A helical spring 38 is connected to the rear end of the trigger and to a link 39 which is provided with a stop flange 40 adapted to engage against a wear plate 41 disposed on the rear end of the body and forming means for yieldably securing the rear end of the spring to the body. When the trigger 33 is dislodged from the bracket arm 30 the spring 38 swiftly withdraws the trigger rearwardly toward the body 10.

The trigger is provided with a disc cam 42 which is provided with a guide pin 43 which projects through the above mentioned opening 31 in the bracket arm 30 and guides the trigger when the trigger is being set, there being sufficient play between the pin and the wall of the opening to permit the trigger projection 35 to pass through the slot 32 and lodge against the front face of the bracket. The cam is of sufficient height to engage the cam surfaces 24 and 25 of the jaws near the pivots of the jaws in rear of the bracket arm 30 when the jaws are open, as best shown in Figure 1. When the animal dislodges the trigger by striking the bait the cam is moved as a unit with the trigger and rides along the cam edges 24 and 25 to close the jaws sharply toward each other, as best shown in Figure 3.

An eye 44 is fixed to the cam 42 below the arm 30 and provides means for setting the trigger. A setting tool 45 resembling somewhat an elongated shoe button hook is adapted to be used for setting the trap. The hook is passed into the guard and engaged over the eye 44 and then withdrawn forwardly to move the trigger forwardly against the tension of the spring 38 until the projection 35 lodges against the front face of the bracket 30 whereupon the hook may be removed. It will be observed that the trapper may thus set the trap without placing his hands in the path of the jaws. The trap may be baited after the jaws are set by thrusting the hook 45 transversely through the mesh of the guard just in rear of the cam 42 so that the trigger is held stationary while the bait is being impaled upon the spear head.

The trap may be anchored in any desired locality above the ground or even under water by means of short chains 46 secured to the guard and equipped with eyes 47 to receive the usual stakes. A short chain 48 is secured to the link 39 at the rear end of the body of the trap and this chain may also be staked down in the usual manner.

From the above description it is thought that the construction and operation of the invention will be fully understood without further explanation.

What is claimed is:

1. A trap comprising a body, a cylindrical wire mesh guard projecting in axial alignment with the body and open at the forward end, opposed jaws pivoted intermediate their ends in the guard, a spring controlled trigger slidable axially of the body, a bracket arm adapted to hold the trigger set, and cam means between the jaws and the trigger adapted to close the jaws when the trigger is released.

2. A trap comprising a body, a wire mesh guard projecting forwardly from the body and open at the forward end, a pair of jaws pivoted intermediate their ends in the guard and having cam faces on their rear ends, an arm carried by the guard and having a slot therein, a spring controlled trigger slidable longitudinally of the guard through said slot, a projection on the trigger engaging the front face of the arm to hold the trigger set, and a cam on the trigger engaging the cam faces of the jaws to close the jaws when the projection is released from the arm.

3. A trap comprising a body having a longitudinal recess therein, a guard projecting forwardly from the body and open at the front end, a trigger slidable longitudinally of the guard and entering said opening, a spring housed in the opening and connected to the trigger for controlling the trigger, a pair of opposed jaws pivoted intermediate their ends in the guard, impaling prongs on the front ends of the jaws, cam faces on the rear ends of the jaws, an arm carried by the guard and forming a catch to hold the trigger set when the trigger is pulled forwardly against the tension of the spring, a cam integral with the trigger and engaging the cam faces of the jaws to close the jaws when the trigger is released, and an eye on the cam below the arm forming means for pulling the trigger forwardly to set position.

4. A trap comprising a body, a cylindrical wire mesh guard extending in axial alignment with the body, a trigger slidable longitudinally of the guard and of the body, a spring housed by the body for moving the trigger in one direction, a cam carried by the trigger, means carried by the cam for moving the trigger in the opposite direction, an arm carried by the guard for holding the trigger at its forward limit of movement, and a pair of opposed jaws pivoted intermediate their ends in the guard and having cam faces at their rear ends engaged by the cam when the trigger is released to permit the cam to close the jaws.

CHARLES M. WARD.